(12) United States Patent
Okamoto

(10) Patent No.: US 6,277,506 B1
(45) Date of Patent: Aug. 21, 2001

(54) THIN FILM MAGNETIC HEAD THIN FILM MAGNETIC HEAD SUBSTRATE AND METHOD FOR FABRICATING SUCH SUBSTRATE

(75) Inventor: Naoyuki Okamoto, Osaka (JP)

(73) Assignee: Sumitomo Special Metals Co., Ltd. (JP)

( * ) Notice: Subject to any disclaimer, the term of this patent is extended or adjusted under 35 U.S.C. 154(b) by 0 days.

(21) Appl. No.: 09/523,199

(22) Filed: Mar. 10, 2000

(30) Foreign Application Priority Data

Mar. 11, 1999 (JP) .................................................. 11-065698

(51) Int. Cl.$^7$ ............................... B32B 9/00; G11B 5/147
(52) U.S. Cl. ........................................... 428/701; 360/126
(58) Field of Search ............................. 360/126; 428/701

(56) References Cited

U.S. PATENT DOCUMENTS 5,764,454 * 6/1998 hishida ................................. 360/126
5,901,021 * 5/1999 hirano et al. ......................... 360/122
5,914,285 * 6/1999 sasaki et al. ............................ 501/87

FOREIGN PATENT DOCUMENTS 60-39807   3/1985 (JP) .
60-229233  11/1985 (JP) .
2-154308   6/1990 (JP) .

* cited by examiner

*Primary Examiner*—Cathy Lam
(74) *Attorney, Agent, or Firm*—Nixon Peabody LLP; Jeffrey L. Costellia (57) ABSTRACT

The thin film magnetic head substrate of this invention includes an alumina titanium carbide base plate and an aluminum oxide layer formed on the alumina titanium carbide base plate. The alumina titanium carbide base plate has a surface modified layer in a surface portion facing the aluminum oxide layer, and the surface modified layer includes aluminum titanate.

16 Claims, 5 Drawing Sheets

THIN FILM MAGNETIC HEAD THIN FILM MAGNETIC HEAD SUBSTRATE AND METHOD FOR FABRICATING SUCH SUBSTRATE

BACKGROUND OF THE INVENTION

The present invention relates to a thin film magnetic head, a substrate for the thin film magnetic head, and a method for fabricating the substrate for the thin film magnetic head.

In recent years, thin film magnetic heads are used for various magnetic recording devices such as hard disk drive (HDD) devices and floppy disk drive (FDD) devices. Such a thin film magnetic head is essentially composed of a substrate, a magnetic shield film deposited on the substrate, and a magnetic element (such as a magnetoresistance (MR) element) and a recording head section formed on the magnetic shield film. The magnetic shield film is made of a soft magnetic material such as Fe—Ni permalloy, Co—Nb—Zr and Co—Fe—B—Si Co-base amorphous materials, and FeAlSi alloy (sendust). As the substrate of the thin film magnetic head, broadly used is a type having an insulating layer made of aluminum oxide deposited on a ceramic base plate made of alumina titanium carbide (AlTiC).

The above thin film magnetic head has a drawback as follows. The adhesion between the AlTiC base plate and the aluminum oxide layer formed thereon is poor, whereby the aluminum oxide layer tends to delaminate from the AlTiC base plate at the interface during the fabrication process and mounting process of the thin film magnetic head, as well as during the actual use thereof. Methods for solving this problem have been proposed, including the method in which an interlayer is provided between the AlTiC base plate and the aluminum oxide layer (see Japanese Patent Publication No. 2-59604) and the method in which the surface of the AlTiC base plate is roughened (see Japanese Laid-Open Patent Publication No. 2-154308). However, there has yet been realized neither a thin film magnetic head substrate of which the AlTiC base plate and the aluminum oxide layer adhere to each other with sufficiently high strength, nor an efficient method for fabricating such a substrate.

A primary object of the present invention is to provide a thin film magnetic head substrate with high reliability where the AlTiC base plate and the aluminum oxide layer adhere to each other with high adhesion strength, and an efficient method for fabricating such a thin film magnetic head substrate.

SUMMARY OF THE INVENTION

The thin film magnetic head substrate of the present invention includes an alumina titanium carbide base plate and an aluminum oxide layer formed on the alumina titanium carbide base plate, wherein the alumina titanium carbide base plate has a surface modified layer in a surface portion facing the aluminum oxide layer, and the surface modified layer includes aluminum titanate.

Preferably, portions of alumina particles included in the alumina titanium carbide base plate that constitute part of the surface modified layer include $\alpha$-$Al_2O_3$, $Al_2TiO_5$, and $Al_2Ti_7O_{15}$.

Also preferably, portions of titanium carbide particles included in the alumina titanium carbide base plate that constitute part of the surface modified layer include cubic TiC, $Al_2TiO_5$, and $Al_2Ti_7O_{15}$.

Still preferably, the centerline average surface roughness Ra of the surface modified layer is less than about 10 nm.

Still preferably, the thickness of the surface modified layer is in the range between about 5 nm or more and about 500 nm or less.

The thin film magnetic head of the present invention includes: the thin film magnetic head substrate described above; and a magnetic element formed on the thin film magnetic head substrate.

According to another aspect of the invention, a method for fabricating a thin film magnetic head substrate is provided. The thin film magnetic head substrate includes an alumina titanium carbide base plate and an aluminum oxide layer formed on the alumina titanium carbide base plate. The method includes the steps of: preparing the alumina titanium carbide base plate; modifying a surface of the alumina titanium carbide base plate into a layer including aluminum titanate by inverse sputtering in an atmosphere containing at least an inert gas; and depositing the aluminum oxide layer on the layer including aluminum titanate after the surface modifying step.

Preferably, the surface modifying step includes the step of modifying a surface of the alumina titanium carbide base plate into a layer including aluminum titanate while etching the surface of the alumina titanium carbide base plate.

Also preferably, the thickness of the layer including aluminum titanate formed in the surface modifying step is in the range between about 5 nm or more and about 500 nm or less.

Still preferably, the thickness of the surface of the alumina titanium carbide base plate etched in the surface modifying step is less than about 10 nm.

Still preferably, the atmosphere in the surface modifying step is an atmosphere containing argon gas and oxygen gas having a pressure in the range of about 2 mTorr to about 20 mTorr, and the proportion of the oxygen gas in the atmosphere is about 40% or less.

Still preferably, the method further includes the step of: grinding the alumina titanium carbide base plate so that the centerline average surface roughness Ra is about 10 nm or less.

DESCRIPTION OF THE PREFERRED EMBODIMENTS

The present inventors have elaborately examined the interface between the alumina titanium carbide (AlTiC) base plate and the aluminum oxide layer of the thin film magnetic head substrate in an attempt of improving the adhesion between the AlTiC base plate and the aluminum oxide layer, and found that the adhesion could be improved by forming a surface modified layer including aluminum titanate on the surface of the AlTiC base plate and depositing the aluminum oxide layer on the surface modified layer.

Hereinafter, the thin film magnetic head substrate and the fabrication thereof of the present invention will be described by way of example with reference to the relevant drawings.

Figure 1:
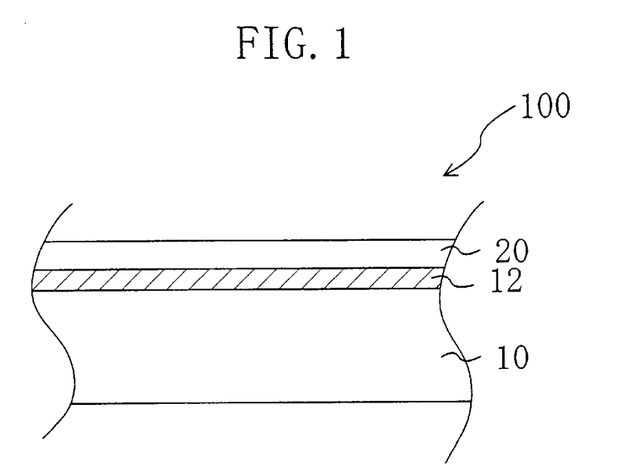
FIG. 1 is a schematic sectional view of a thin film magnetic head substrate of an embodiment of the present invention.

FIG. 1 shows the sectional structure of a thin film magnetic head substrate 100 of one embodiment of the present invention. In this embodiment, used as the ceramic base plate is an AlTiC base plate 10 made of alumina titanium carbide containing about 64% by weight of alumina that has a thickness of about 2 mm and a diameter of about 100 mm (for example, AC-7 manufactured by Sumitomo Special Metals Co., Ltd.). The thin film magnetic head substrate 100 also includes an aluminum oxide layer 20 having a thickness of about 5 $\mu$m deposited on the AlTiC base plate 10. The AlTiC base plate 10 has a surface modified layer 12 formed by modifying the surface portion thereof. As will be described in detail, the surface modified layer 12 of the AlTiC base plate 10 is expected to have a function of improving the adhesion of the AlTiC base plate 10 with the aluminum oxide 20.

Figure 2:
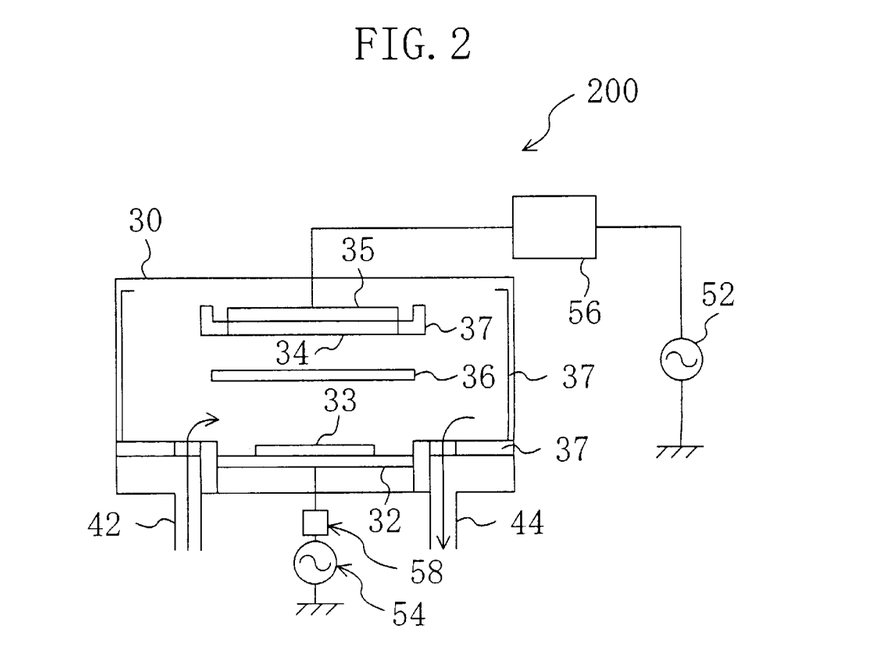
FIG. 2 is a view of an apparatus used for fabrication of the thin film magnetic head substrate of the embodiment of the present invention.

A method for fabricating the thin film magnetic head substrate 100 will be described with reference to FIG. 2.

An AlTiC base plate 33 is ground with diamond paste (grain size: 1$\mu$), for example, so that the centerline average surface roughness Ra of the AlTiC base plate 33 is less than about 10 nm, preferably less than about 5 nm. This value of the centerline average surface roughness Ra of the AlTiC base plate 33 is required to ensure that the centerline average surface roughness Ra of the base plate 33 obtained after the base plate 33 is modified (i.e., the surface of the surface modified layer 12) is less than about 10 nm, preferably less than about 5 nm, as will be discussed later.

The surface of the base plate 33 is then modified to form the surface modified layer 12. The surface can be modified by inverse sputtering by use of a sputtering apparatus 200 shown in FIG. 2.

The sputtering apparatus 200 includes a chamber 30, a feed pipe 42 and an exhaust pipe 44 for feeding and exhausting gas in and from the chamber 30, power supplies 52 and 54 for supplying power to a sample and a target in the chamber 30, and matching boxes 56 and 58 for impedance matching.

Inside the chamber 30, a plate holder (electrode) 32 and a backing plate (electrode) 35 are placed to face each other. The plate holder 32 holds the AlTiC base plate 33 and applies a predetermined voltage to the base plate 33. The backing plate 35 holds a target 34 fixedly and applies a predetermined voltage to the target 34. A retractable shutter 36 is disposed between the AlTiC base plate 33 and the target 34. The power supply 52 supplies power to the backing plate 35 via the matching box 56, while the power supply 54 supplies power to the plate holder 35 via the matching box 58. The plate holder 32 is equipped with a water-cooled cooler (not shown) for cooling the AlTiC base plate 32. Optionally, a protector 37 may be provided for protecting the inside of the chamber 30 from being contaminated.

The surface-ground AlTiC base plate 33 is put into intimate contact with the plate holder 32 via liquid metal. The plate holder 32 is water-cooled to keep the base plate 33 cooled to a temperature not exceeding about 70° C. at the surface thereof. An Ar gas atmosphere is then created in the chamber 30. Under this atmosphere, RF power is supplied to the plate holder 32.

The inverse sputtering process is carried out in an inert gas atmosphere such as an argon gas atmosphere. The pressure of the gas is preferably in the range of about 2 mTorr to about 20 mTorr (about 0.27 Pa to about 2.7 Pa). If the pressure is less than about 2 mTorr (about 0.27 Pa), etching may be instable. If it exceeds about 20 mTorr (about 2.7 Pa), not etching but deposition may occur in some cases. Oxygen gas may be mixed in the inert gas as the atmosphere gas. The volume proportion of the oxygen gas in the atmosphere is preferably about 40% or less, more preferably about 10% or less. If the volume proportion of the oxygen gas exceeds 40%, an oxide film of TiC may be formed. This may block etching of the surface and thus formation of the surface modified layer. In order to minimize formation of an oxide film of TiC, the volume proportion of the oxygen gas is more preferably about 10% or less.

The RF power to be supplied is preferably in the range of about 0.5 W/cm$^2$ to about 2 W/cm$^2$, more preferably about 0.6 W/cm$^2$ to about 1.8 W/cm$^2$.

The duration of the inverse sputtering is preferably about 2 minutes or longer, more preferably in the range of about 3 minutes to about 5 minutes. If the duration is shorter than about 2 minutes, the resultant surface modified layer will not be uniform and thus fail to provide satisfactorily improved adhesion. A sufficiently uniform surface modified layer can be obtained by continuing the inverse sputtering for about 5 minutes. In the actual fabrication process, a longer duration of the inverse sputtering may be adopted for minimizing a variation in one substrate when the substrate is large or minimizing a variation in one batch when a number of substrates are fabricated in one chamber. Taking such a variation into consideration, the duration of about 10 minutes of the inverse sputtering will be enough for formation of a sufficiently uniform surface modified layer.

The thickness of the surface modified layer is preferably in the range of about 5 nm to about 500 nm. If the thickness is less than about 5 nm, sufficiently high adhesion strength may not be obtained. If it exceeds about 500 nm, the productivity will lower. In the light of the uniformity of the surface modified layer and the production efficiency, the thickness of the surface modified layer is more preferably in the range of about 30 nm to about 300 nm. The centerline average surface roughness Ra of the surface modified layer is preferably less than about 10 nm, more preferably about 5 nm or less. If Ra is about 10 nm or more, the aluminum oxide to be deposited on the surface modified layer may irregularly grow, forming non-uniform concave and convex portions on the surface of the aluminum oxide layer, which may lower the efficiency of the subsequent smoothing process. In order to minimize such irregular growth of the aluminum oxide layer, the centerline average surface roughness Ra of the surface modified layer is more preferably about 5 nm or less. The above value of the centerline average surface roughness Ra of the surface modified layer, i.e., less than about 10 nm, more preferably about 5 nm or less, can be obtained by appropriately setting the surface roughness of the AlTiC base plate 33 to be used and the conditions for the surface modification process.

Thereafter, an aluminum oxide layer is deposited on the resultant base plate 33 with the surface modified layer formed in the surface portion thereof. The aluminum oxide layer (corresponding to the aluminum oxide layer 20 in FIG. 1) is deposited using the same sputtering apparatus 200 by known normal sputtering in succession to the preceding surface modification process. By depositing the aluminum oxide layer in the same chamber in succession to the surface modification process, the modified surface is prevented from being contaminated.

Specifically, after the surface modification process, the chamber 30 is once depressurized to about $0.5\mu$ Torr (about $6.7 \times 10^{-5}$ Pa) to be ready for normal sputtering. The normal sputtering is carried out in the following manner, for example. That is, while a DC bias in the range of about 10 V to about −200 V is being applied to the base plate 33, RF power in the range of about 2 W/cm² to 7 W/cm² is supplied to the backing plate 35 that carries a sintered alumina as the target 34, in an atmosphere of an inert gas such as argon under a pressure in the range of about 3 mTorr to about 20 mTorr (about 0.4 Pa to about 2.7 Pa). The aluminum oxide layer may be deposited by a method other than the normal sputtering, such as ion plating.

The thin film magnetic head substrate was actually fabricated by modifying the AlTiC substrate by inverse sputtering and depositing the aluminum oxide layer having a thickness of about 5 m by normal sputtering under the following conditions. The thickness of the aluminum oxide layer 20 is normally in the range of about 3 $\mu$m to about 15 $\mu$g m, which may be appropriately set depending on the use of the resultant magnetic head substrate.

AlTiC base plate: AC-7 manufactured by Sumitomo Special Metals Co., Ltd.

Centerline average surface roughness Ra of AlTiC base plate after surface grinding: about 1.5 nm Conditions of inverse sputtering:

Atmosphere: Ar gas, 10 mTorr (1.3 Pa)

RF power to base plate: 0 to 1.8 W/Cm²

Duration: 0 to 10 minutes

Conditions of normal sputtering:

Atmosphere: Ar gas, 10 mTorr (1.3 Pa)

Bias to base plate: −100 V DC

RF power to target: 5 W/cm²

The AlTiC base plate and the aluminum oxide layer of the resultant thin film magnetic head substrate were evaluated for the adhesion strength and the presence of delamination from each other after cutting of the substrate. The adhesion strength was evaluated using a scratch tester (Model 502 manufactured by Teledyne Taber Corp.) by averaging the values of ten samples. The presence of delamination after cutting of the substrate was evaluated using an optical microscope. The conditions of the surface modification process and the resultant evaluation results are shown in Table 1 below.

TABLE 1

| RF power to base plate | Duration of Reverse sputtering (min) | Adhesion strength (grm) | Delamination after cutting |
|---|---|---|---|
| — | — | 120 | X |
| 0.3 | 3 | 180 | X |
| 0.3 | 10 | 200 | X |
| 0.6 | 3 | 380 | ◯ |
| 0.9 | 3 | 450 | ◯ |
| 0.9 | 10 | 420 | ◯ |
| 1.2 | 3 | 450 | ◯ |
| 1.8 | 1 | 420 | ◯ |
| 1.8 | 3 | 450 | ◯ |

As is apparent from Table 1, the sample substrate that was not subjected to inverse sputtering and the sample substrates subjected to the inverse sputtering for the duration of 3 minutes and 10 minutes with RF power to the base plate of 0.3 W/cm² exhibited low adhesion strength (200 grm or less). They also exhibited delamination of the aluminum oxide layer from the base plate when the substrate was cut. On the contrary, all the sample substrates subjected to the inverse sputtering for the duration of 1 to 10 minutes with RF power to the base plate in the range of 0.6 to 1.8 W/cm² exhibited improved adhesion strength. They exhibited no delamination after cutting. Specifically, the adhesion strength of the substrate subjected to the inverse sputtering for 3 minutes with the RF power to the base plate of 0.6 W/cm² (380 grm) was more than three times as high as that of the substrate subjected to no inverse sputtering (120 grm). The adhesion strength of the substrate subjected to the inverse sputtering for 10 minutes with the RF power to the base plate of 0.9 W/cm² (420 grm) was roughly identical to that of the substrate subjected to the inverse sputtering for 3 minutes with the same value of RF power (450 grm). This indicates that a certain length of duration is enough for the inverse sputtering and after that the effect will not be enhanced even if the inverse sputtering is continued longer.

From TEM observation of the resultant sample substrates, it was found that the surface modified layer having a thickness of about 30 nm to 300 nm had been formed and that the centerline average surface roughness Ra of the surface modified layer was in the range of about 1 nm to 5 nm.

As a result of the examination of various conditions, the following conditions were found to be suitable for the inverse sputtering.

The atmosphere for the inverse sputtering is preferably an inert gas atmosphere or an inert gas atmosphere containing oxygen gas in an amount by volume of about 40% or less, preferably about 10% or less. The pressure of the atmosphere gas is preferably in the range of about 2 mTorr to about 20 mTorr (about 0.27 Pa to about 2.7 Pa). The RF power to be supplied is preferably in the range of about 0.5 W/cm² to about 2 W/cm2, more preferably about 0.6 W/cm² to about 1.8 W/cm².

The duration of the inverse sputtering is preferably about 2 minutes or longer, more preferably in the range of about 3 minutes to about 5 minutes. The centerline average surface roughness Ra of the surface modified layer is preferably less than about 10 nm, more preferably about 5 nm or less.

As described above, according to the present invention, the adhesion strength between the AlTiC base plate and the aluminum oxide layer significantly improves. According to the present invention, also, the surface modification is realized by inverse sputtering using the sputtering apparatus that is conventionally used for formation of the aluminum oxide layer. As a result, a thin film magnetic head substrate having good adhesion can be fabricated with high efficiency.

Figure 3A:
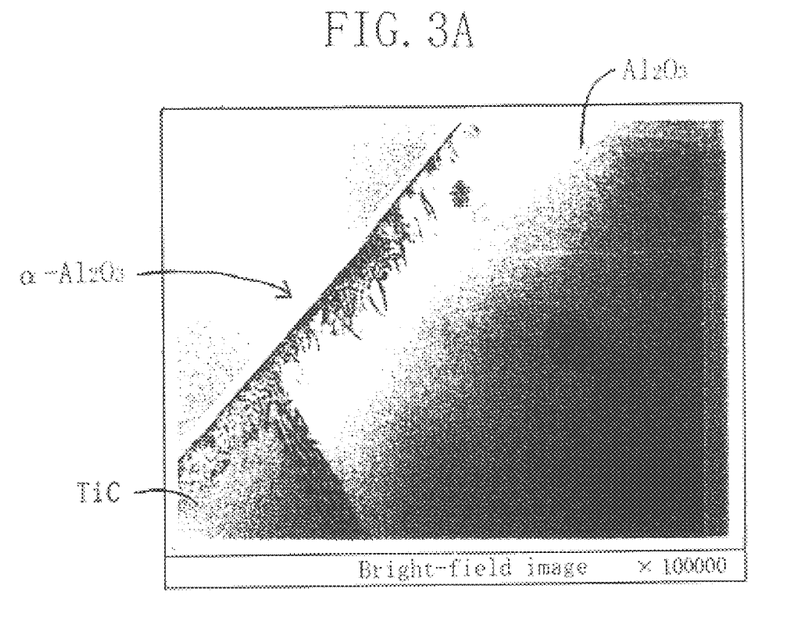
FIGS. 3A and 3B are TEM (transmission electron microscope) photographs of sections of the thin film magnetic head substrate of the embodiment of the present invention, showing the states at the interface between alumina particles in an AlTiC base plate and an aluminum oxide layer.
Figure 3B:
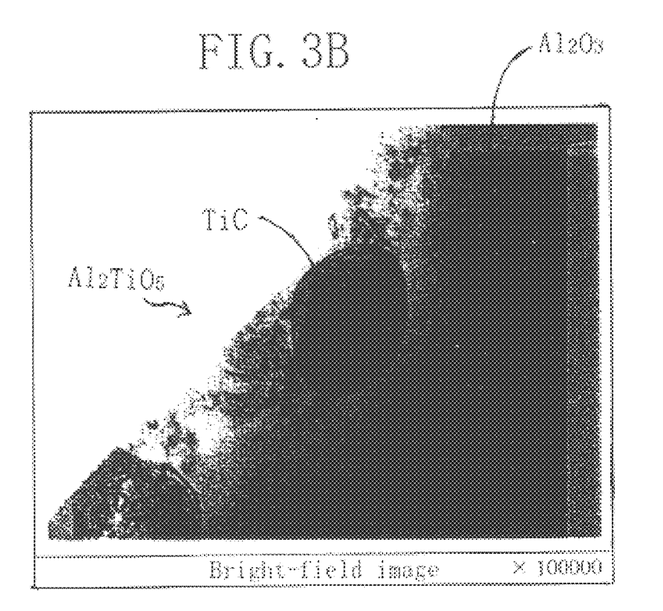
Figure 3C:
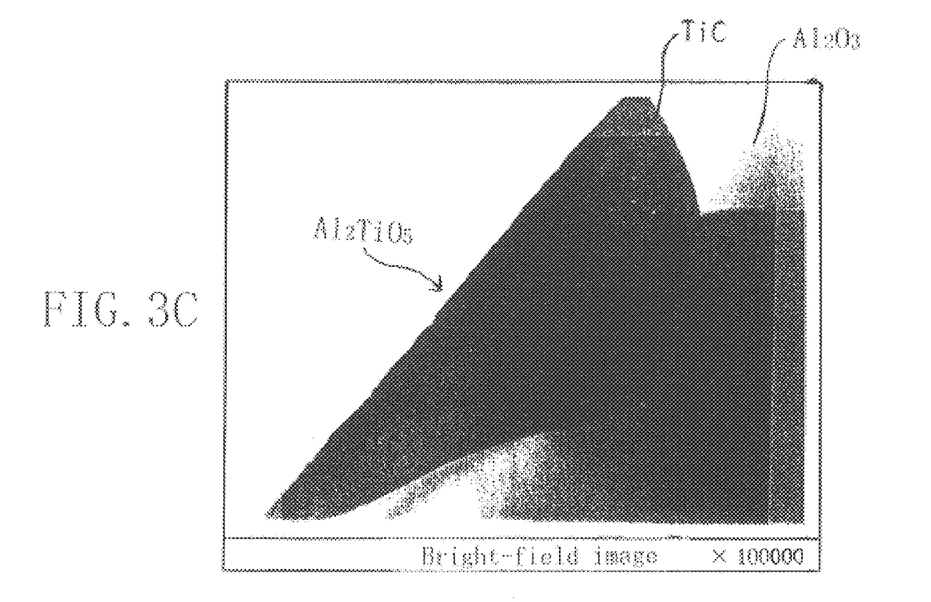
FIG. 3C is a TEM photograph of a section of the thin film magnetic head substrate of the embodiment of the present invention, showing the state at the interface between titanium carbide particles in the AlTiC base plate and the aluminum oxide layer.

Using the above adhesion-improved substrate, the conditions of the interface between the AlTiC base plate and the aluminum oxide layer (structure and composition of the surface modified layer) were evaluated by transmission electron microscopy (TEM), electron diffraction, and energy-dispersion x-ray (EDX) spectroscopy. FIGS. 3A, 3B, and 3C show TEM photographs of the section of the thin film magnetic head substrate according to the present invention. The portions indicated by the arrows in the respective figures were subjected to crystal structure analysis using electron diffraction and composition analysis using EDX.

As a result, it was found that an $\alpha$-$Al_2O_3$ crystal phase (including Ti) was formed in the portion indicated by the arrow in FIG. 3A that is a surface portion of an alumina particle in the AlTiC base plate (a portion constituting part of the surface modified layer 12 in FIG. 1). Also found was that an $Al_2TiO_5$ crystal phase was formed in the portion indicated by the arrow in FIG. 3B, and that an $Al_2TiO_5$ crystal phase was formed in the portion indicated by the arrow in FIG. 3C that is a surface portion of a titanium carbide particle in the AlTiC base plate (a portion constituting part of the surface modified layer 12 in FIG. 1). The crystal structure analysis and composition analysis of the surface modified layer were also carried out for various types of substrates in the manner as described above. As a result, it was found that $\alpha$-$Al_2O_3$ (including Ti), $Al_2TiO_5$, and $Al_2Ti_7O_{15}$ were present in the portions of alumina particles in the AlTiC base plate that constitute part of the surface modified layer. Also found was that cubic TiC (including Al), $Al_2TiO_5$ and $Al_2Ti_7O_{15}$ were present in the portions of titanium carbide particles in the AlTiC base plate that constitute part of the surface modified layer. Thus, it was found that aluminum titanate was present in both the portions of alumina particles and titanium carbide particles. The mean size of both the alumina particles and titanium carbide particles used in the above examples was about 1 $\mu$m.

Figure 4:
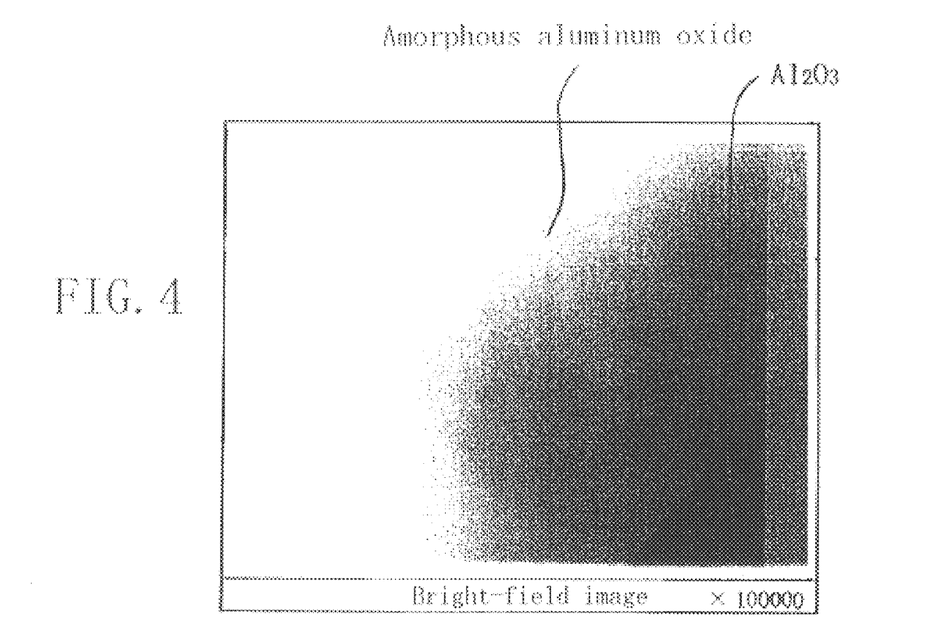
FIG. 4 is a TEM photograph of a section of the thin film magnetic head substrate of the embodiment of the present invention, showing mainly the state of the aluminum oxide layer.

The aluminum oxide layer deposited by sputtering was also evaluated by TEM, electron diffraction, and EDX. As a result, as shown in the TEM photograph of FIG. 4, it was found that the aluminum oxide layer was in an amorphous state including 12% by weight of argon. The Vickers hardness (Hv) of the amorphous aluminum oxide layer was about 750, which is lower than that of $\alpha$-$Al_2O_3$ (1800). From the temperature profile with respect to the membrane stress, the following were found. The aluminum oxide layer has temperature hysteresis and changes toward increase of compressive stress. The thermal expansion coefficient of the aluminum oxide layer is estimated as about 7 ppm/K, which is lower than that of the AlTiC base plate by about 8%.

Figure 5A:
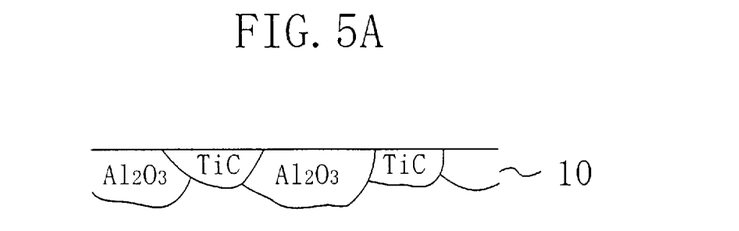
FIGS. 5A to 5C are schematic views illustrating the mechanism of the formation of a surface modified layer in a fabrication method of the thin film magnetic head substrate of the embodiment of the present invention.
Figure 5B:
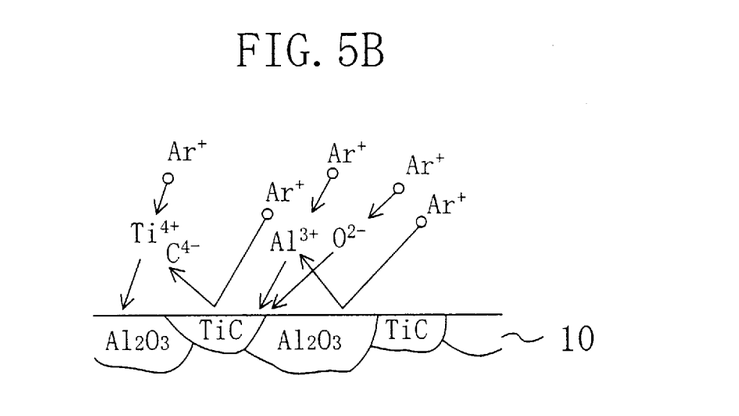
Figure 5C:
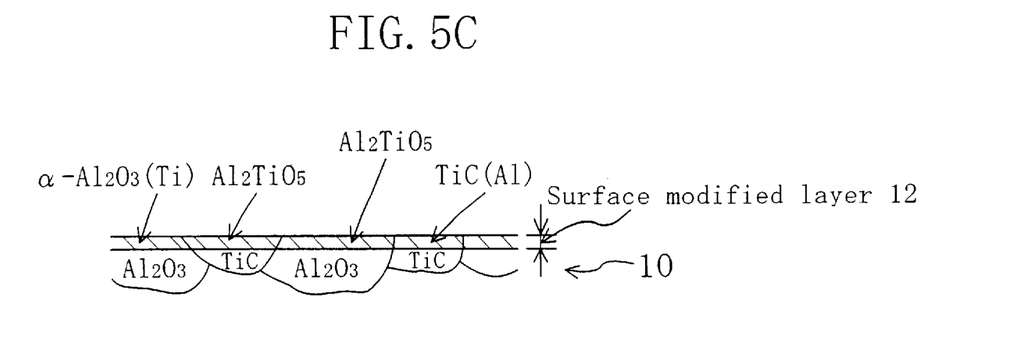

From the results of the crystal structure analysis and composition analysis of the surface modified layer described above, the following is considered to be the mechanism of the surface modification in the fabrication method of the magnetic head substrate according to the present invention. FIGS. 5A to 5C schematically illustrate the mechanism of the surface modification.

Ground surfaces of alumina particles and titanium carbide particles are exposed on the ground surface of the AlTiC base plate (FIG. 5A).

In the inverse sputtering process, Ar ions collide against the surface of the AlTiC base plate, forcing Ti ions, Al ions, and oxygen ions in the AlTiC base plate to be sputtered out from the base plate. In this way, the surface of the AlTiC base plate is etched (FIG. 5B). As the etching proceeds, Ti ions, Al ions, and oxygen ions sputtered out from the AlTiC base plate collide against the surface of the AlTiC base plate, resulting in entering the base plate and diffusing therein.

As a result, Ti ions, Al ions, and oxygen ions that have entered the AlTiC base plate from the surface thereof and diffused therein are combined to form aluminum titanates such as $Al_2TiO_5$ and $Al_2Ti_7O_{15}$, thereby forming a surface modified layer (FIG. 5C).

The centerline average surface roughness Ra of the surface modified layer according to the present invention is preferably less than about 10 nm. In the examples described above, it was about 5 nm or less. This indicates that the improvement of the adhesion by the surface modified layer is not derived from the effect of surface roughening (so-called anchoring effect). Rather, presumed to contribute to the improvement of the adhesion is the crystal structure and composition of the surface modified layer and/or the structure and composition of the aluminum oxide layer deposited thereon.

Hereinafter, an embodiment of the thin film magnetic head of the present invention will be described with reference to FIG. 6.

Figure 6:
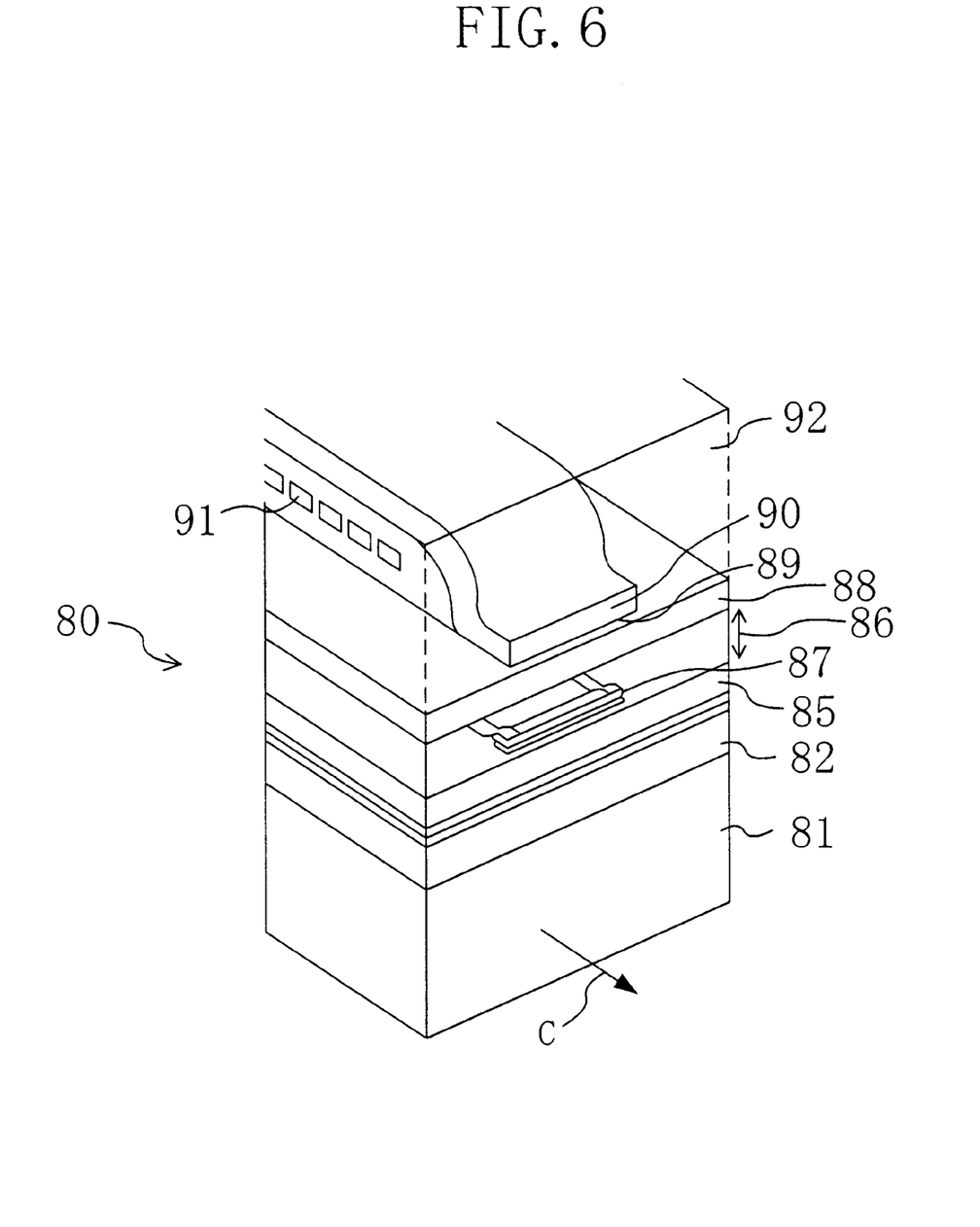
FIG. 6 is a perspective view of a main portion of a thin film magnetic head of an embodiment of the present invention.

FIG. 6 is a perspective view of a main portion of a thin film magnetic head 80 of this embodiment. The thin film magnetic head 80 includes an AlTiC base plate 81, an aluminum oxide layer 82 having a thickness of about 3 to about 15 $\mu$m deposited on the AlTiC base plate 81, and an FeAlSi alloy film 85 deposited on the aluminum oxide layer 82. The FeAlSi alloy film 85, which serves as a sendust film, includes 85.0% by weight of Fe, 5.5% by weight of Al, and 9.5% by weight of Si, and has a thickness of 2 $\mu$m in this embodiment. The hard axis of the FeAlSi alloy film 85 points in the direction indicated by the arrow a in FIG. 6.

A gap 86 of about 0.4 $\mu$m is formed on the FeAlSi alloy film 85 so that an MR element 87 for reproduction is mounted in the gap 86. The MR element 87 has a known structure including an electrode and an MR film although not shown. The gap 86 is composed of an insulating film made of alumina and the like deposited on the FeAlSi alloy film 85. The MR element 87 has a thickness of about 0.1 $\mu$m, for example.

A bottom pole 88 (thickness: 2 to 3 $\mu$m) is formed on the insulating film serving as the gap 86. The bottom pole 88 is formed of a soft magnetic material such as permalloy and also serves as a magnetic shield film. A top pole 90 (thickness: 2 to 3 $\mu$m) is formed on the bottom pole 88 with a write gap 89 having a thickness of 0.4 to 0.6 $\mu$m therebetween. A coil pattern 91 is formed between the bottom pole 88 and the top pole 90 by patterning a Cu film having a thickness of about 5 $\mu$m. The coil pattern 91 is surrounded with an organic insulating film. The bottom pole 88, the coil pattern 91, and the top pole 90 constitute a recording head portion of the thin film magnetic head. A magnetic field is generated in the vicinity of the write gap 89 by energizing the coil pattern 91, so that write (recording) of data on a recording medium (now shown) is effected. The recording head portion is covered with an overcoat 92 (thickness: 40 $\mu$m, for example).

The layered structure described above is fabricated by a normal thin film deposition technique and lithographic technique. Although the FeAlSi alloy film 85 is formed by sputtering in this embodiment, other thin film deposition methods may be employed.

The thin film magnetic head 80 includes, beneath the MR element 87, the structure that is substantially the same as the thin film magnetic head substrate 100 described above. Therefore, there arises no problem such as delamination at the interface between the AlTiC base plate and the aluminum oxide layer.

The magnetic element (reproduction element) formed on the magnetic shield film is not limited to the MR element, but other types of elements may be used.

Thus, according to the present invention, a surface modified layer including aluminum titanate is formed on the AlTiC base plate. This makes it possible to provide a thin film magnetic head substrate with high reliability where the AlTiC base plate and the aluminum oxide adhere to each other with high adhesion strength.

In addition, according to the present invention, the surface of the AlTiC base plate can be modified into a layer including aluminum titanate by inverse sputtering in an atmosphere containing at least an inert gas. This makes it possible to efficiently fabricate a thin film magnetic head substrate with high reliability where the AlTiC base plate and the aluminum oxide adhere to each other with high adhesion strength.

The thin film magnetic head substrate of the present invention is suitably used for thin film magnetic heads for a variety of magnetic recording devices such as hard disk drive (HDD) devices and floppy disk drive (FDD) devices for computers and the like.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of he invention.

What is claimed is:

1. A thin film magnetic head substrate comprising an alumina titanium carbide base plate and an aluminum oxide layer formed on the alumina titanium carbide base plate, wherein the alumina titanium carbide base plate has a surface modified layer in a surface portion facing the aluminum oxide layer, and the surface modified layer includes aluminum titanate.

2. The thin film magnetic head substrate of claim 1, wherein the alumina titanium carbide base plate includes alumina particles and portions of the alumina particles that constitute part of the surface modified layer include $\alpha$-$Al_2O_3$, $Al_2TiO_5$, and $Al_2Ti_7O_{15}$.

3. The thin film magnetic head substrate of claim 1, wherein the alumina titanium carbide base plate includes titanium carbide particles and portions of the titanium carbide particles that constitute part of the surface modified layer include cubic TiC, $Al_2TiO_5$, $Al_2Ti_7O_{15}$.

4. The thin film magnetic head substrate of claim 1, wherein a centerline average surface roughness Ra of the surface modified layer is less than about 10 nm.

5. The thin film magnetic head substrate of claim 1, wherein the thickness of the surface modified layer is in the range between about 5 nm or more and about 500 nm or less.

6. A thin film magnetic head comprising:

a thin film magnetic head substrate including an alumina titanium carbide base plate and an aluminum oxide layer formed on the alumina titanium carbide base plate, the alumina titanium carbide base plate having a surface modified layer in a surface portion facing the aluminum oxide layer, and the surface modified layer including aluminum titanate; and a magnetic element formed on the thin film magnetic head substrate.

7. The thin film magnetic head of claim 6, wherein the alumina titanium carbide base plate includes alumina particles and portion of the alumina particles that constitute part of the surface modified layer include $\alpha$-$Al_2O_3$, $Al_2TiO_5$, and $Al_2Ti_7O_{15}$.

8. The thin film magnetic head of claim 6, wherein the alumina titanium carbide base plate includes titanium carbide particles and portions of the titanium carbide particles that constitute part of the surface modified layer include cubic TiC, $Al_2TiO_5$, $Al_2Ti_7O_{15}$.

9. The thin film magnetic head of claim 6, wherein a centerline average surface roughness Ra of the surface modified layer is less than about 10 nm.

10. The thin film magnetic head of claim 7, wherein the thickness of the surface modified layer is in the range between about 5 nm or more and about 500 nm or less.

11. A thin film magnetic head substrate including an alumina titanium carbide base plate and an alumina oxide layer formed on the alumina titanium carbide base plate, the thin film magnetic head substrate being produced by a process comprising the steps of:

preparing the alumina titanium carbide base plate;

modifying a surface of the alumina titanium carbide base plate into a layer including aluminum titanate by inverse sputtering in an atmosphere containing at least an inert gas; and depositing the aluminum oxide layer on the layer including aluminum titanate after the surface modifying step.

12. The thin film magnetic head substrate of claim 11, wherein the surface modifying step comprises the step of modifying a surface of the alumina titanium carbide base plate into a layer including aluminum titanate while etching the surface of the alumina titanium carbide base plate.

13. The thin film magnetic head substrate of claim 11, wherein a thickness of the layer including aluminum titanate formed in the surface modifying step is in the range between about 5 nm or more and about 500 nm or less.

14. The thin film magnetic head substrate of claim 12, wherein the thickness of the surface of the alumina titanium carbide base plate etched in the surface modifying step is less than about 10 nm.

15. The thin film magnetic head substrate of claim 11, wherein the atmosphere in the surface modifying step is an atmosphere containing argon gas and oxygen gas having a pressure in the range of about 2 mTorr to about 20 mTorr, and the proportion of the oxygen gas in the atmosphere is about 40% or less.

16. The thin film magnetic head substrate of claim 11, the process further comprising the step of:

grinding the alumina titanium carbide base plate so that a centerline average surface roughness Ra is about 10 nm or less.

* * * * *